United States Patent
Jeong

(10) Patent No.: US 8,232,220 B2
(45) Date of Patent: Jul. 31, 2012

(54) METHOD FOR MANUFACTURING AN ARTIFICIAL LIGHTWEIGHT AGGREGATE CONTAINING BOTTOM ASH

(75) Inventor: Young Ho Jeong, Seoul (KR)

(73) Assignee: Lee Kang Hoon, Gyeonggi-do (KR)

( * ) Notice: Subject to any disclaimer, the term of this patent is extended or adjusted under 35 U.S.C. 154(b) by 42 days.

(21) Appl. No.: 12/298,027

(22) PCT Filed: Apr. 3, 2007

(86) PCT No.: PCT/KR2007/001632
§ 371 (c)(1), (2), (4) Date: Jun. 26, 2009

(87) PCT Pub. No.: WO2007/126215
PCT Pub. Date: Nov. 8, 2007

(65) Prior Publication Data
US 2009/0325781 A1 Dec. 31, 2009

(30) Foreign Application Priority Data
Apr. 28, 2006 (KR) .................. 10-2006-0038534

(51) Int. Cl.
*C04B 33/135* (2006.01)
*B28B 3/20* (2006.01)

(52) U.S. Cl. ........ 501/155; 501/141; 264/638; 264/639; 264/679; 264/680

(58) Field of Classification Search ............... 501/155, 501/141; 264/638, 639, 679, 680
See application file for complete search history.

(56) References Cited

U.S. PATENT DOCUMENTS

| | | | | | |
|---|---|---|---|---|---|
| 4,770,831 | A | * | 9/1988 | Walker | 264/82 |
| 5,362,319 | A | * | 11/1994 | Johnson | 106/705 |
| 6,068,803 | A | * | 5/2000 | Weyand et al. | 264/82 |
| 6,342,461 | B1 | * | 1/2002 | Lee et al. | 501/141 |
| 7,655,088 | B2 | * | 2/2010 | Bethani | 106/705 |
| 7,704,317 | B2 | * | 4/2010 | Bethani | 106/705 |
| 7,780,781 | B2 | * | 8/2010 | Bethani | 106/705 |

(Continued)

FOREIGN PATENT DOCUMENTS

GB 1260001 1/1972

(Continued)

OTHER PUBLICATIONS

Russian Patent and Trademark Agency, Official Action, Russian Patent Application No. 0811438/15RU, Jan. 28, 2011.

(Continued)

*Primary Examiner* — Karl Group
(74) *Attorney, Agent, or Firm* — Tristan A. Fuierer; Andrew D. Gerschutz; Moore & Van Allen, PLLC

(57) ABSTRACT

The present invention relates to a method for producing an artificial lightweight aggregate containing bottom ash. The method includes the steps of: (a) mixing 100 parts by weight of clay and 10-100 parts by weight of bottom ash to obtain a mixture; (b) extrusion-molding the mixture by using an extruder and cutting the extrusion-molded mixture to form a molded article; (c) drying the molded article by using a rotary drier; and (d) sintering the dried article at 1050-1150° C. for 15-45 minutes to produce the artificial lightweight aggregate. The aggregate produced according to the invention is lightweight, cost-effective, and has uniform water absorption.

8 Claims, 1 Drawing Sheet

U.S. PATENT DOCUMENTS

2002/0132722 A1 * 9/2002 Raichel et al. ................ 501/155

FOREIGN PATENT DOCUMENTS

| GB | 2166427 | * | 5/1986 |
| IL | 110300 | * | 2/1998 |
| KR | 1019920006804 B1 | | 8/1992 |
| KR | 19940025975 | | 12/1994 |
| KR | 19970061815 | | 9/1997 |
| KR | 19970074706 | | 12/1997 |
| KR | 100150485 B1 | | 6/1998 |
| KR | 1020020026794 A | | 4/2002 |
| KR | 1020030011756 A | | 2/2003 |
| KR | 1020030011757 A | | 2/2003 |
| KR | 1020030064572 A | | 8/2003 |
| KR | 1020030070204 A | | 8/2003 |
| KR | 2005021036 | * | 3/2005 |

OTHER PUBLICATIONS

Onatsky, S.P., Production of Clayite, Moscow Construction Literature Publishers, 1971, pp. 142-143.

* cited by examiner

METHOD FOR MANUFACTURING AN ARTIFICIAL LIGHTWEIGHT AGGREGATE CONTAINING BOTTOM ASH

CROSS-REFERENCE TO RELATED APPLICATIONS

This application is filed under the provisions of 35 U.S.C. §371 and claims the priority of International Patent Application No. PCT/KR2007/001632 filed on 3 Apr. 2007 entitled "Method for Manufacturing an Artificial Lightweight Aggregate Containing Bottom Ash" in the name of Young Ho Jeong, which claims priority of Korean Patent Application No. 10-2006-0038534 filed on 28 Apr. 2006, both of which are hereby incorporated by reference herein in their entirety.

TECHNICAL FIELD

The present invention relates to a method for producing an artificial lightweight aggregate containing bottom ash, and more particularly to a method for producing an artificial lightweight aggregate containing bottom ash, which comprises the steps of: (a) mixing 100 parts by weight of clay and 10-100 parts by weight of bottom ash to obtain a mixture; (b) extrusion-molding the mixture by using an extruder and cutting the extrusion-molded mixture into a desired shape; (c) drying the molded article by using a rotary drier; and (d) Sintering the dried article at 1050-1150° C. for 15-45 minutes to produce the artificial lightweight aggregate.

BACKGROUND ART

Along with rapid industrial development, the amount of coal ash generated as a by-product in thermal power plants has also increased as the use of electric power has increased in recent years. The amount of coal ash generated was approximately 4,500,000 tons in Korea in 2000 and it is expected that approximately 6,000,000 tons of coal ash will be generated in the year 2010.

Generally, the term "coal ash" refers to powdery substance solids which are left as residues after the combustion or the incineration of coal. Most coal ash is generated in the thermal power plants. Besides these power plants, waste incinerators, combined heat and power plants (CHP), and other industrial fields generate coal ash in the course of the combustion process. Since the coal ash is a residue from combusted coal, it is a material that is recyclable as inorganic substances, for example, $SiO_2$, $Al_2O_3$ and $Fe_2O_3$. However, the coal ash is subjected to a combustion process, and hence it always contains unburnt carbon additionally, which causes a problem in applying technically.

The coal ash is largely classified into fly ash, cinder ash and bottom ash depending on its generation site. Among these, the bottom ash is ash that collects at the bottom of the combustion chamber, which is also called "clinker ash". The bottom ash occupies about 10-15% of the total amount of coal ash generated.

The bottom ash is produced by allowing granules formed by means of sintering within a combustion furnace to fall to the bottom of a boiler to form solids and the solids to be then pulverized to a particle size of less than 25 mm using a pulverizer. Generally, the bottom ash produced by pulverization of the pulverizer has a particle diameter of 1-20 mm or so, and comprises $SiO_2$, $Al_2O_3$, $Fe_2O_3$, CaO, MgO, $Na_2O$ and $K_2O$ as main chemical ingredients. The bottom ash particles form an aggregate of very irregular particles including particles which have a porous surface and remains unburnt upon the combustion of coal ash, and particles which resemble sand particles and have a diameter of more than 5 mm. In addition, it is known that the bottom ash has various particle shapes or chemical components depending on ash generation sites, has a specific gravity of 2.1-2.7 or so, has a dry weight of 720-1600 kg/m³, has no plasticity and has water absorption ranging greatly from 2.0 to 30.0% or so. Most of bottom ash exhibits a grey color and may exhibit various colors such as yellow, black and pale ash colors depending on environment where it is generated. Unburnt carbon particles exhibit black colors, and the bottom ash containing silica and alumina components in a large amount exhibits pale ash and yellow colors.

Examples of a bottom ash treatment system include a direct sluicing system, a dewatering bin storing system, a water recirculation system, a chain conveyer system, etc.

The direct sluicing system is a system in which bottom ash discharged from a hopper disposed at the bottom of a boiler is directly transferred to an ash pond together with water through an ash transmission line. The direct sluicing process is performed such that bottom ash in the form of a clinker, which is mixed with water, is pulverized by a pulverizer mounted at an outlet of the hopper, and is then transferred to the ash pond with a jet pump. Such a direct sluicing system is very useful in case where the distance from a power plant to the ash pond is very short, and typically employs seawater since a large quantity of water is required for ash treatment. Further, a solution for preventing water pollution due to water used for ash treatment and reducing the quantity of water to be used employs a method of recirculating water used to the bottom ash hopper.

The dewatering bin storing system is a system in which bottom ash crushed is transferred to a dewatering bin together with water through an ash transmission line and is stored in the dewatering bin for 24 hours for the purpose of dewatering. Thereafter, the dewatered bottom ash is transported to an ash pond using a belt conveyor, a truck or the like so as to be landfilled in the ash pond or to be utilized for other purposes. Such a system is suitable for the case where the bottom ash is used as roadbed material or raw materials in cement manufacture.

The water recirculation system is a system in which bottom ash mixed with water is transferred to the dewatering bin to dewater the mixture in the same method as in the dewatering bin storing system. Particularly, it is unique that water discharged from the dewatering bin is transported to a settling pond or settling tank and is sedimented for recycling. This system is widely used in a large-capacity coal thermal power plant as it can minimize the amount of water to be used in the bottom ash treatment.

In addition, the chain conveyer system is a system in which a water-immersion type chain conveyor is mounted at a clinker hopper disposed at the bottom of the boiler so that bottom ash collected at the bottom of the boiler is rapidly cooled using water contained in the hopper, is pulverized and is then discharged to the outside of the hopper using the conveyor. Such a system is widely used in Europe centering around Germany since it permits low driving power and small installation space and requiring a small quantity of water to be used in bottom ash treatment.

This coal ash, a by-product generated from the coal thermal power plant was mainly treated in a coal ash disposal pond installed additionally in the power plant. In the past when the availability of the national land was high, the coal ash disposal was somewhat easy. However, recently, owing to the rapid increase of the demand for factory sites and the rise of the land values resulting from high economic growth rate, it has become difficult to find an ash pond requiring an area three to four times as large as the area for a power plant facility.

Thus, in case of fly ash, various research institutes and academic circles have conducted researches incessantly, and as a result, the fly ash is recycled as a variety of materials such as cement admixtures, embanking materials, earth reformation materials, lightweight aggregates, etc. Particularly, the fly ash occupies about 90% of the total recycling rate since the use of the fly ash as a concrete admixture and a raw material in cement manufacture is activated.

However, despite the above described various bottom ash disposal systems, most of the bottom ash is discarded and landfilled in an ash pond around the power plant or is landfilled in an inland area or coastal landfill, being mixed with the fly ash. Besides this, a small quantity of bottom ash is used as a roadbed embanking material around the power plant. Accordingly, this caused difficulties in securing ash disposal sites as well as environmental pollution problems. Thus, there is an urgent need for disposal of the bottom ash.

Moreover, since the physical and chemical property of the bottom ash itself is not good, difficulty is involved in easily recycling the bottom ash. As a result, review of a solution for recycling the bottom ash must be sufficiently performed. At the present day, advanced foreign countries has actively conducted review of applicability of the bottom ash as a roadbed aggregate, a fill-up material and a filler material so as to apply such bottom ash to the industrial field.

Examples of a conventional technique using the bottom ash as an aggregate include Korean Patent Laid-Open Publication No. 1997-074076 relating to a substitution of a part of a natural and artificial aggregate, Korean Patent Laid-Open Publication No. 1997-061815 entitled "a method of fabricating lightweight construction materials using bottom ash generated from combined heat and power plant" in which the bottom ash generated form the combined heat and power plant is partly used in the fabrication of the lightweight construction material, Korean Patent Laid-Open Publication No. 2002-0026794 entitled "concrete product using bottom ash and method for producing the same" in which the bottom ash is used as an aggregate to produce the concrete product, and Korean Patent Registration No. 10-047676 entitled "concrete composition using bottom ash as an aggregate substitute material mixed with concrete" in which the concrete composition contains cement using a fine aggregate of bottom ash substituting for sand and a natural coarse aggregate as cobblestone. However, the aforementioned conventional prior arts have a limitation in that in most cases, the bottom ash was combined with other natural aggregate to produce a concrete or lightweight construction material and its use amount is also restricted.

Coal ash can be used in a large amount in an aggregate and architectural field. Especially, in case of an aggregate as a construction material, the supply of an aggregate gradually becomes difficult due to the exhaustion of natural aggregate resources and occurrence of an environmental problem according to production of crushed stone. Potential amount of aggregate reserves is reduced in terms of the supply of domestic natural aggregate resources, and lots of problems with supply occur due to the remote location of aggregate production sites and a large increase in traffic congestion and distribution costs. Thus, it is expected that occupancy ratio of crushed stone to marine aggregate will increase in the future. Also, along with scale-up and quality enhancement of constructional structures, lightweightness of structural members becomes a critical factor, which causes a high-cost artificial lightweight aggregate to be manufactured using advanced materials of quartz or clay. Many researches have been conducted on preparation of concrete admixture and artificial lightweight aggregate using coal ash, paper mill sludge, slag, etc., in Korea. But the use of the artificial lightweight aggregate is relatively low as compared to foreign advanced countries due to a rise in production costs caused by high-temperature calcination, relatively low strength, difficulty of quality control and sluggishness of product development using produced aggregate.

In addition, as compared to the fly ash of existing coal ash, the bottom ash is nearly buried in ash pond, and hence large sized ash pond is required. This result in a dramatic construction cost and has an adverse effect on environment. There is therefore a need for an alternative bottom ash disposal method. However, since a method of recycling the bottom ash has several technical restrictions, the research on the bottom ash is not actively being conducted. Such a shortcoming is roughly divided into two types.

First, since particle size distribution is very heterogeneous, quality stability is remarkably deteriorated in the production of a lightweight aggregate and unburnt carbon needs to be separated in the course of production of bottom ash so as to maintain good physical properties. Also, since bottom ash particle having a particle size of more than 1 mm must be subjected to particle size separation or pulverization process, economic efficiency will decrease.

Second, since most of the thermal power plants adopt a method of storing the bottom ash together with water in an ash pond, the bottom ash contains a large quantity of moisture (10-30%), and removal of moisture is basically needed to recycle such bottom ash. This results in a restriction in an optimum moisture content range necessary for formation of lightweight aggregates, and hence there is a limitation in increasing the additional amount of the bottom ash. As a result, mass disposal of the bottom ash becomes difficult. In order to solve this problem, there is a need for complicated techniques in which a dry additional material is added to the bottom ash or the moisture content is reduced by drying the bottom ash.

In a conventional aggregate production field, researches have been actively performed on a method of recycling the fly ash which has been subjected to a disposal process. There have been numberous proposed techniques of producing an artificial aggregate using fly ash as in the following prior arts: Korean Patent Registration No. 10-150485 entitled "a method of producing artificial lightweight aggregate", Korean Patent Registration No. 10-0150485 entitled "a method of producing high-strength artificial aggregate using fly ash as a main material", Korean Patent Laid-Open Publication No. 10-1994-0025975 entitled "lightweight aggregate and preparation method thereof" and Korean Patent Registration No. 10-0056890 entitled "preparation method of artificial lightweight aggregate".

However, an artificial aggregate using bottom ash is difficult to produce due to the aforementioned shortcomings.

Thus, the present inventors have confirmed that as a new construction material capable of replacing natural aggregates being exhausted, an economically efficient artificial lightweight aggregate containing bottom ash can be produced by disposing the bottom ash with a low recycling rate in a large amount, while making water absorption uniform to maintain physical properties through the maximum reduction of water absorption deviation of respective lightweight aggregates that may occur during mass production and have completed the present invention.

SUMMARY OF THE INVENTION

It is a main object of the present invention to provide an artificial lightweight aggregate containing bottom ash, which is economically efficient and prevents degradation of physical properties through the reduction of water absorption deviation by disposing bottom ash, that is difficult to recycle due to the necessity of particle size separation or pulverization process, in a large amount and mixing the disposed bottom ash with clay in an optimum ratio, and a method for producing the same.

To achieve the above object, the present invention provides a method for producing an artificial lightweight aggregate containing bottom ash, which comprises the steps of: (a) mixing 100 parts by weight of clay and 10-100 parts by weight of bottom ash to obtain a mixture; (b) extrusion-molding the mixture by using an extruder and cutting the extrusion-molded mixture into a desired shape; (c) drying the molded article by using a rotary drier; and (d) Sintering the dried article at 1050-1150° C. for 15-45 minutes to produce the artificial lightweight aggregate.

The present invention also provides an artificial lightweight aggregate having uniform water absorption, which is produced by the method, contains 100 parts by weight of clay and 10-100 parts by weight of bottom ash.

The present invention also provides a method for producing an artificial lightweight aggregate containing bottom ash, which comprises the steps of: (a) mixing 100 parts by weight of clay, 10-100 parts by weight of bottom ash, and 10-30 parts by weight of dust to obtain a mixture; (b) extrusion-molding the mixture by using an extruder and cutting the extrusion-molded mixture to form a molded article; (c) drying the molded article by using a rotary drier; and (d) Sintering the dried article at 1050-1150° C. for 15-45 minutes to produce the artificial lightweight aggregate.

The present invention also provides an artificial lightweight aggregate having uniform water absorption, which is produced by the method, contains 100 parts by weight of clay, 10-100 parts by weight of bottom ash, and 10-30 parts by weight of dust.

The above and other objects, features and embodiments of the present invention will be more clearly understood from the following detailed description and accompanying claims.

DETAILED DESCRIPTION OF THE INVENTION, AND PREFERRED EMBODIMENTS

Figure 1:
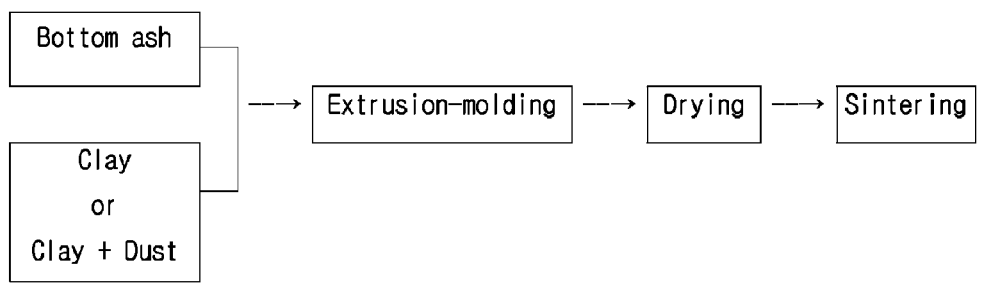
FIG. 1 is a block diagram showing a process of producing an artificial lightweight aggregate according to the present invention.
Figure 2:
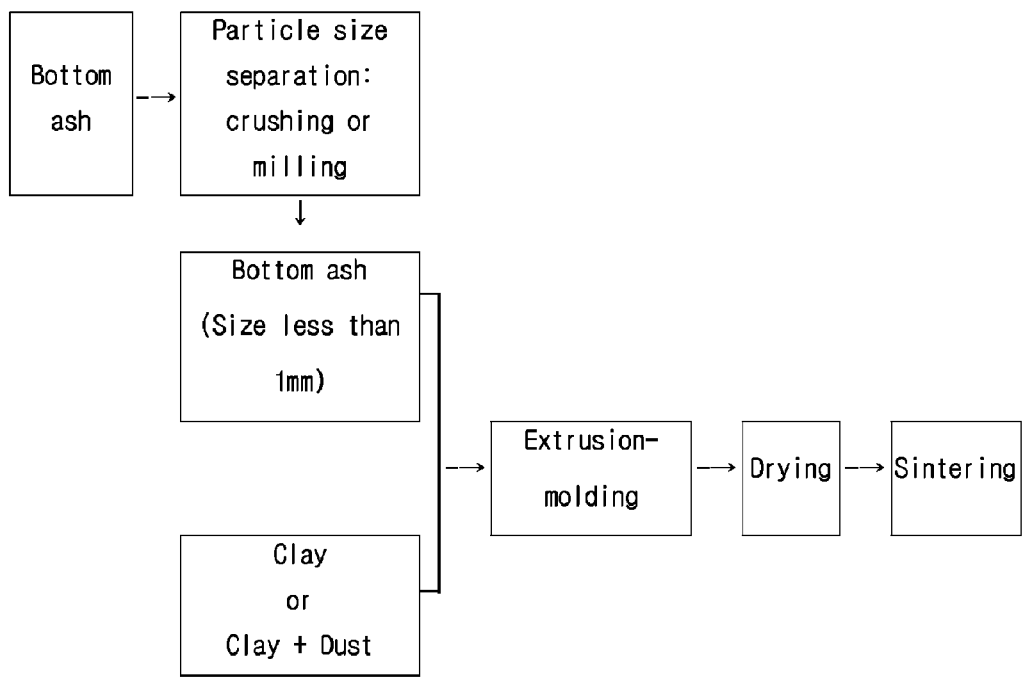
FIG. 2 is a block diagram showing a process of producing an artificial lightweight aggregate, to which a particle size separation and pulverization step is added, according to the present invention.

In one aspect, the present invention relates to a method for producing an artificial lightweight aggregate containing bottom ash, which comprises the steps of: (a) mixing 100 parts by weight of clay and 10-100 parts by weight of bottom ash to obtain a mixture; (b) extrusion-molding the mixture by using an extruder and cutting the extrusion-molded mixture into a desired shape; (c) drying the molded article by using a rotary drier; and (d) Sintering the dried article at 1050-1150° C. for 15-45 minutes to produce the artificial lightweight aggregate, and to an artificial lightweight aggregate having uniform water absorption, which is produced by the method, and contains 100 parts by weight of clay and 10-100 parts by weight of bottom ash.

In the present invention, preferably, the bottom ash in the step (a) is obtained by being subjected to particle size separation or pulverization, and the obtained bottom ash has a particle size of less than 1 mm.

In another aspect, the present invention relates to a method for producing an artificial lightweight aggregate containing bottom ash, which comprises the steps of: (a) mixing 100 parts by weight of clay, 10-100 parts by weight of bottom ash, and 10-30 parts by weight of dust to obtain a mixture; (b) extrusion-molding the mixture by using an extruder and cutting the extrusion-molded mixture into a desired shape; (c) drying the molded article by using a rotary drier; and (d) Sintering the dried article at 1050-1150° C. for 15-45 minutes to produce the artificial lightweight aggregate, and to an artificial lightweight aggregate having uniform water absorption, which is produced by the method, and contains 100 parts by weight of clay, 10-100 parts by weight of bottom ash, and 10-30 parts by weight of dust.

In the present invention, preferably, the dust comprises marble dust and dried coal ash.

In the present invention, in order to produce the lightweight aggregate, 10-45% by weight of bottom ash, 10% by weight of dust (marble dust, dried coal ash), 45-80% by weight of clay are mixed with each other based on the total weight of the lightweight aggregate. When they are mixed with each other, the given bottom ash may comprise bottom ash as well as bottom ash obtained by crushing the bottom ash into a particle size of less than 1 mm. The mixed raw material is primarily extrusion-molded by using an extruder, is cut to conform to the particle size distribution of the lightweight aggregate, and is secondarily molded in a round shape to form a molded article. Then, the molded article is dried by a rotary drier and then the dried article is calcined at 1050-1150° C. for 15-45 minutes in a rotary kiln.

EXAMPLES

The present invention will hereinafter be described in further detail by examples. However, it is to be understood that these examples can be modified into other various forms, and the scope of the present invention is not intended to be limited to such examples. Such examples are given to more fully describe the present invention for a person skilled in the art.

In these examples, the bottom ash generated in Young-Heung thermal power plant was used. The bottom ash has a moisture content of 31.23% and volatile solids of 26%. The chemical components of the bottom ash comprise $SiO_2$ 45.54%, $Al_2O_3$ 18.59%, $Fe_2O_3$ 8.07%, etc., as shown in Table 1.

TABLE 1

| Chemical components | | | | | | | | | | | | | |
|---|---|---|---|---|---|---|---|---|---|---|---|---|---|
| | Component | | | | | | | | | | | | |
| | $SiO_2$ | $Al_2O_3$ | $Fe_2O_3$ | CaO | MgO | $Na_2O$ | $K_2O$ | $TiO_2$ | $ZrO_2$ | $P_2O_5$ | $Cr_2O_3$ | MnO | C |
| bottom ash | 45.54 | 18.59 | 8.07 | 2.17 | 0.78 | 0.18 | 0.51 | 1.33 | 0.33 | 0.24 | 0.01 | 0.05 | 18.05 |

Also, as a result of analyzing the particle size distribution of the bottom ash through a sieve analysis test, the bottom ash with a particle size of less than 0.85 μm having no problem when mixing clay raw material and the lightweight aggregate was 53.45%, and the bottom ash with a particle size of more than 5 mm was 8.57%, suggesting that particle size distribution was very heterogeneous. The more concrete particle size distribution of the bottom ash is shown in Table 2 and mass per unit volume was 968 kg/m³.

TABLE 2

Particle size distribution

| Particle size | Weight (%) |
| --- | --- |
| Less than 0.85 μm | 53.45 |
| More than 0.85 μm | 9.89 |
| More than 1.7 mm | 6.54 |
| More than 2.36 mm | 21.55 |
| More than 4.75 mm | 8.57 |

(1) Determination of Moisture Content of a Molded Article

In order to use bottom ash with moisture content of 30% in the production of a lightweight aggregate, mixed raw material must be supplied within a range of 20±1% which is the optimum moisture content for molding in an extrusion-molding step. In order to determine the additional amount possible in a mass-production process, the moisture content of the mixed raw material was tested. As a test result, in order to produce a lightweight aggregate mixed with bottom ash through the extrusion-molding process, it was found that it was difficult to add bottom ash of more than 15% at the maximum. From this result, techniques that can control the moisture content for the purpose of mass disposal of the bottom ash need to be introduced.

Test Example 1

After clay having a moisture content of about 20% and bottom ash having a moisture content of about 31% had been weight-measured, 10 parts by weight of bottom ash and 90 parts by weight of clay were mixed with each other. Thereafter, the mixture was subjected to pulverization and kneading processes and then was manually molded into a round shape. The molded article of the prepared lightweight aggregate had a moisture content of 20.22%.

Test Example 2

A molded article was prepared in the same method as that in Test Example 1 by mixing 20 parts by weight of bottom ash and 80 parts by weight of clay with each other. The molded article of the prepared lightweight aggregate had a moisture content of 21.45%.

Test Example 3

A molded article was prepared in the same method as that in Test Example 1 by mixing 30 parts by weight of bottom ash and 70 parts by weight of clay with each other. The molded article of the prepared lightweight aggregate had a moisture content of 22.67%.

Test Example 4

A molded article was prepared in the same method as that in Test Example 1 by mixing 40 parts by weight of bottom ash and 60 parts by weight of clay with each other. The molded article of the prepared lightweight aggregate had a moisture content of 23.89%.

Test Example 5

A molded article was prepared in the same method as that in Test Example 1 by mixing 30 parts by weight of bottom ash, 10 parts by weight of dust and 60 parts by weight of clay with each other. The molded article of the prepared lightweight aggregate had a moisture content of 19.23%.

Test Example 6

A molded article was prepared in the same method as that in Test Example 1 by mixing 40 parts by weight of bottom ash, 10 parts by weight of dust and 50 parts by weight of clay with each other. The molded article of the prepared lightweight aggregate had a moisture content of 20.24%.

TABLE 3

Moisture content of lightweight aggregates

| | Clay | Bottom ash | Dust | Moisture content (%) |
| --- | --- | --- | --- | --- |
| Test Example 1 | 90 | 10 | | 20.22 |
| Test Example 2 | 80 | 20 | | 21.45 |
| Test Example 3 | 70 | 30 | | 22.67 |
| Test Example 4 | 60 | 40 | | 23.89 |
| Test Example 5 | 60 | 30 | 10 | 19.23 |
| Test Example 6 | 50 | 40 | 10 | 20.24 |

The test results of Test Examples 1 to 6 were compared in Table 3. As shown in Table 3, it can be seen that the aggregates further containing dust produced in Test Examples 5 and 6, the moisture content was reduced as compared to the aggregates produced in Test Examples 1 to 4 containing clay and bottom ash (2) Comparison Between Physical Properties of Lightweight Aggregates Using Bottom Ash and Fly Ash Test Example 7

After clay having a moisture content of about 20% and bottom ash having a moisture content of about 31% had been weight-measured, 10 parts by weight of bottom ash and 90 parts by weight of clay were mixed with each other. Thereafter, the mixture was subjected to pulverization and kneading processes and then was manually molded into a round shape. The prepared lightweight aggregate had a specific gravity of 1.650 and water absorption of 9.76%.

Test Example 8

A molded article was prepared in the same method as that in Test Example 7 by mixing 20 parts by weight of bottom ash and 80 parts by weight of clay with each other. The calcination process was performed in an electric furnace at approximately 1100° C. The prepared lightweight aggregate had a specific gravity of 1.503 and water absorption of 10.89%.

Test Example 9

A molded article was prepared in the same method as that in Test Example 7 by mixing 30 parts by weight of bottom ash and 70 parts by weight of clay with each other. The calcination process was performed in an electric furnace at approximately 1100° C. The prepared lightweight aggregate had a specific gravity of 1.367 and water absorption of 15.16%.

Test Example 10

A molded article was prepared in the same method as that in Test Example 7 by mixing 40 parts by weight of bottom ash and 60 parts by weight of clay with each other. The calcination process was performed in an electric furnace at approximately 1100° C. The prepared lightweight aggregate had a specific gravity of 1.397 and water absorption of 13.95%.

Test Example 11

A molded article was prepared in the same method as that in Test Example 7 by mixing 20 parts by weight of bottom ash, 10 parts by weight of dust and 70 parts by weight of clay with each other. The calcination process was an electric furnace at approximately 1100° C. The prepared lightweight aggregate had a specific gravity of 1.338 and water absorption of 19.47%.

Test Example 12

A molded article was prepared in the same method as that in Test Example 7 by mixing 30 parts by weight of bottom ash, 10 parts by weight of dust and 60 parts by weight of clay with each other. The calcination process was performed in an electric furnace at approximately 1100° C. The prepared lightweight aggregate had a specific gravity of 1.324 and water absorption of 21.11%.

Comparative Example 1

A molded article was prepared in the same method as that in Test Example 7 by mixing 10 parts by weight of fly ash and 90 parts by weight of clay with each other. The calcination process was performed in an electric furnace at approximately 1100° C. The prepared lightweight aggregate had a specific gravity of 1.627 and water absorption of 9.28%.

Comparative Example 2

A molded article was prepared in the same method as that in Test Example 7 by mixing 20 parts by weight of fly ash and 80 parts by weight of clay with each other. The calcination process was performed in an electric furnace at approximately 1100° C. The prepared lightweight aggregate had a specific gravity of 1.620 and water absorption of 9.67%.

Comparative Example 3

A molded article was prepared in the same method as that in Test Example 7 by mixing 30 parts by weight of fly ash and 70 parts by weight of clay with each other. The calcination process was performed in an electric furnace at approximately 1100° C. The prepared lightweight aggregate had a specific gravity of 1.519 and water absorption of 14.81%.

Comparative Example 4

A molded article was prepared in the same method as that in Test Example 7 by mixing 40 parts by weight of fly ash and 60 parts by weight of clay with each other. The calcination process was performed in an electric furnace at approximately 1100° C. The prepared lightweight aggregate had a specific gravity of 1.438 and water absorption of 22.38%.

TABLE 4

Comparison of specific gravities and water absorptions of lightweight aggregates produced in electric furnace

| | Clay | Bottom ash | Fly ash | Dust | Specific gravity | Water absorption (%) |
|---|---|---|---|---|---|---|
| Test Example 7 | 90 | 10 | | | 1.650 | 9.76 |
| Test Example 8 | 80 | 20 | | | 1.503 | 10.89 |
| Test Example 9 | 70 | 30 | | | 1.367 | 15.16 |
| Test Example 10 | 60 | 40 | | | 1.397 | 13.95 |
| Test Example 11 | 70 | 20 | | 10 | 1.338 | 19.47 |
| Test Example 12 | 60 | 30 | | 10 | 1.324 | 21.11 |
| Comparative Example 1 | 90 | | 10 | | 1.627 | 9.28 |
| Comparative Example 2 | 80 | | 20 | | 1.620 | 9.67 |
| Comparative Example 3 | 70 | | 30 | | 1.519 | 14.81 |
| Comparative Example 4 | 60 | | 40 | | 1.438 | 22.38 |

The above Table 4 shows specific gravities and water absorptions of lightweight aggregates produced accordind to Test Examples 7 to 12 and Comparative Examples 1 to 4. As a measurement result of physical properties of a lightweight aggregate produced by mixing bottom ash and clay and a lightweight aggregate produced by mixing fly ash and clay, even in case where the lightweight aggregate was produced by mixing bottom ash and clay in a mixture ratio as described above, it had been shown that a good lightweight aggregate having an absolute dried specific gravity of less than 1.5 and a water absorption of less than 20% could be produced. Also, despite an increase in the amount of bottom ash added, producing a lightweight aggregate using adding bottom ash more easy as compared to producing a lightweight aggregate using fly ash. In addition, a deviation in water absorption was not great, and hence quality stability of a lightweight aggregate was maintained. Thus, the problem of ununiform water absorption due to mass production of existing lightweight aggregates could be solved.

(3) Comparison of Physical Properties Between Lightweight Aggregates Produced in Mass Production Process

Test Example 13

After clay having a moisture content of about 20% and bottom ash having a moisture content of about 31% had been weight-measured, 15 parts by weight of bottom ash and 85 parts by weight of clay were mixed with each other. Thereafter, the mixture was subjected to pulverization and kneading processes and then was primarily molded to form a molded article using an extruder mounted with a mold having a plurality round holes drilled therein, each of which has a diameter of 5-11 mm. At this time, the molded article is cut into a predetermined length using a rotary cutter and is then transferred to a rolling drum so as to be secondarily molded into a round shape. The calcination process was performed in a rotary kiln at approximately 1100° C. The prepared lightweight aggregate had a specific gravity of 1.268 and water absorption of 13.92%.

Test Example 14 parts by weight of bottom ash, 10 parts by weight of dust and 60 parts by weight of clay were mixed with each other, and then a molded article was formed in an extruder in the same method as that in Test Example 13. The calcination process was performed in a rotary kiln at approximately 1100° C. The prepared lightweight aggregate had a specific gravity of 1.396 and water absorption of 21.28%.

Test Example 15

45 parts by weight of bottom ash, 10 parts by weight of dust and 45 parts by weight of clay were mixed with each other, and then a molded article was formed in an extruder in the same method as that in Test Example 13. The calcination process was performed in a rotary kiln at approximately 1100° C. The prepared lightweight aggregate had a specific gravity of 1.379 and water absorption of 20.42%.

Test Example 16

15 parts by weight of crushed bottom ash (size less than 1 mm) and 85 parts by weight of clay were mixed with each other, and then a molded article was formed in an extruder in the same method as that in Test Example 13. The calcination process was performed in a rotary kiln at approximately 1100° C. The prepared lightweight aggregate had a specific gravity of 1.379 and water absorption of 13.71%.

Test Example 17

30 parts by weight of crushed bottom ash (size less than 1 mm) and 70 parts by weight of clay were mixed with each other, and then a molded article was formed in an extruder in the same method as that in Test Example 13. The calcination process was performed in a rotary kiln at approximately 1100° C. The prepared lightweight aggregate had a specific gravity of 1.425 and water absorption of 14.85%.

Comparative Example 5

15 parts by weight of fly ash and 85 parts by weight of clay were mixed with each other, and then a molded article was formed in an extruder in the same method as that in Test Example 13. The calcination process was performed in a rotary kiln at approximately 1100° C. The prepared lightweight aggregate had a specific gravity of 1.385 and water absorption of 13.19%.

TABLE 5

Comparison between physical properties of lightweight aggregates produced in a rotary kiln

| | Clay | Bottom ash | Clushed bottom ash | Fly ash | Dust | Specific gravity | Water absorption (%) |
|---|---|---|---|---|---|---|---|
| Test Example 13 | 85 | 15 | | | | 1.268 | 13.92 |
| Test Example 14 | 60 | 30 | | | 10 | 1.396 | 15.28 |
| Test Example 15 | 45 | 45 | | | 10 | 1.379 | 19.42 |
| Test Example 16 | 85 | | 15 | | | 1.379 | 13.71 |
| Test Example 17 | 70 | | 30 | | | 1.425 | 14.85 |
| Comparative Example 5 | 85 | | | 15 | | 1.385 | 13.19 |

Test Examples 13 to 17 and Comparative Example 5 were conducted according to the case where bottom ash is used, the case where bottom ash is used and the case where bottom ash crushed into a diameter of less than 1 mm is used. From the respective cases, the specific gravities and the water absorptions were compared with each other. As a comparison result, as shown in Table 5, the physical properties in Examples 13 to 17 were maintained identical to those in Comparative Example 5 using fly ash without any great change in physical properties of the respective lightweight aggregates. Also, an absolute dried specific gravity was less than 1.5, and bottom ash crushed has relatively superior water absorption to that of bottom ash not crushed. Particularly, it had been shown that a lightweight aggregate containing clay and bottom ash has relatively excellent water absorption as compared to a lightweight aggregate containing clay and bottom ash.

INDUSTRIAL APPLICABILITY

As described in detail above, according to the present invention, a lightweight aggregate is produced by mixing bottom ash that did not satisfy a desired physical property of an aggregate with clay and dust in an optimum mixture ratio, so that the problem that there is a great deviation in water absorptions of a lightweight aggregates that are mass-produced using existing fly ash was solved so as to reduce a deviation in water absorptions depending on a change in the amount of raw material added during mass production, thereby making it possible to produce an artificial lightweight aggregate having uniform water absorption. In addition, bottom ash that was difficult to dispose is disposed in a large quantity and thus cost required for installation of an ash pond is reduced and the bottom ash is recycled so that the produced artificial lightweight aggregate is economically efficient. Also, it is possible to solve environment-related problems.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A method for producing an artificial lightweight aggregate containing bottom ash, the method comprising:
    (a) mixing 100 parts by weight of clay and 10-100 parts by weight of bottom ash generated in thermal power plants to obtain a mixture, wherein the bottom ash consists of ash that is a residue from combusted coal;
    (b) extrusion-molding the mixture by using an extruder and cutting the extrusion-molded mixture into a desired shape;
    (c) drying the molded article by using a rotary drier; and
    (d) sintering the dried article at 1050-1150° C. for 15-45 minutes to produce the artificial lightweight aggregate.

2. The method for producing an artificial lightweight aggregate containing bottom ash according to claim 1, wherein the bottom ash in step (a) is obtained by being subjected to particle size separation or pulverization.

3. The method for producing an artificial lightweight aggregate containing bottom ash according to claim 1, wherein the obtained bottom ash has a particle size of less than 1 mm.

4. The method for producing an artificial lightweight aggregate containing bottom ash according claim 1, wherein the mixture in step (a) further comprises 10-30 parts by weight of dust, based on 100 parts by weight of clay.

5. The method for producing an artificial lightweight aggregate containing bottom ash according to claim 4, wherein the dust comprises marble dust and dried coal ash.

6. The method for producing an artificial lightweight aggregate containing bottom ash according to claim 1, wherein the lightweight aggregate has less than 1.5 specific gravity.

7. The method for producing an artificial lightweight aggregate containing bottom ash according to claim 1, wherein the lightweight aggregate has less than 20% water absorption.

8. The method for producing an artificial lightweight aggregate containing bottom ash according to claim 1, wherein the bottom ash is ash that collects in the bottom portion of a combustion chamber.

* * * * *